(12) United States Patent
Miller et al.

(10) Patent No.: US 7,685,108 B2
(45) Date of Patent: Mar. 23, 2010

(54) SYSTEM AND METHOD FOR GEOCODING DIVERSE ADDRESS FORMATS

(75) Inventors: Julia K. Miller, Niskayuna, NY (US); Chuck Schwerin, Wynantskill, NY (US)

(73) Assignee: Pitney Bowes Software Inc., Troy, NY (US)

( * ) Notice: Subject to any disclaimer, the term of this patent is extended or adjusted under 35 U.S.C. 154(b) by 703 days.

(21) Appl. No.: 11/242,920

(22) Filed: Oct. 5, 2005

(65) Prior Publication Data
US 2006/0041573 A1    Feb. 23, 2006

Related U.S. Application Data

(62) Division of application No. 10/159,195, filed on May 31, 2002, now Pat. No. 7,039,640.

(60) Provisional application No. 60/295,103, filed on May 31, 2001.

(51) Int. Cl.
*G06F 17/30* (2006.01)
(52) U.S. Cl. .............................. 707/3; 701/201; 701/202
(58) Field of Classification Search .................. 707/1, 707/3, 6, 100, 101, 200; 701/201, 202, 207, 701/211, 217; 709/202; 715/737, 738, 764
See application file for complete search history.

(56) References Cited

U.S. PATENT DOCUMENTS

| | | | |
|---|---|---|---|
| 4,989,151 A | 1/1991 | Nuimura | |
| 5,381,338 A | 1/1995 | Wysocki et al. | |
| 5,470,233 A | 11/1995 | Fruchterman et al. | |
| 5,796,634 A | 8/1998 | Craport et al. | |
| 6,016,393 A | 1/2000 | White et al. | |
| 6,101,496 A * | 8/2000 | Esposito | 707/6 |

(Continued)

FOREIGN PATENT DOCUMENTS

WO    WO 96/34354    10/1996

(Continued)

OTHER PUBLICATIONS

Kevin S. McCurley, Geospatial Mapping and Navigation of the WebMay 1, 2001, WWW10, pp. 1-16.*

(Continued)

*Primary Examiner*—Fred I Ehichioya
(74) *Attorney, Agent, or Firm*—Michael J. Cummings; Angelo N. Chaclas

(57) ABSTRACT

A method and system for providing geocodes in response to complete or partial address information is disclosed. The disclosure teaches embodiments that are naturally upgraded to integrate changing spatial information due to addition of countries, better data, political changes, and other similar changes in geographical data. A single geocoding engine is capable of handling the various address formats in use in different countries and jurisdictions. The disclosed embodiments are error tolerant and capable of overcoming many errors due to spelling, variety of languages and formats used to provide and address. The diversity in addresses due to, for instance country-specific formats such as postal-codes are naturally integrated into existing database of geocoding information. Preferably, the embodiments are based on JAVA to allow platform independence and use XML based communication to use networks without requiring excessive resources while providing fast services.

5 Claims, 9 Drawing Sheets

U.S. PATENT DOCUMENTS

| | | | |
|---|---|---|---|
| 6,292,743 B1 * | 9/2001 | Pu et al. ...................... | 701/202 |
| 6,363,411 B1 | 3/2002 | Dugan et al. | |
| 6,373,817 B1 | 4/2002 | Kung et al. | |
| 6,516,337 B1 * | 2/2003 | Tripp et al. ................. | 709/202 |
| 6,552,670 B2 | 4/2003 | Sundaravel et al. | |
| 6,604,046 B1 | 8/2003 | Van Watermulen et al. | |
| 2002/0000999 A1 | 1/2002 | McCarty et al. | |
| 2002/0054082 A1 * | 5/2002 | Karpf ......................... | 345/738 |

FOREIGN PATENT DOCUMENTS

| | | |
|---|---|---|
| WO | WO 00/23862 | 4/2000 |
| WO | WO 01/09765 | 2/2001 |

OTHER PUBLICATIONS

R. J. McNab et al., "A Distributed Digital Library Architecture Incorporating Different Index Styles," Research and Technology Advances In Digital Libraries, 1998, IEEE International Forum on Proceedings, Apr. 22-24, 1998, pp. 36-45.

Belfore et al., "An interactive land use VRML application (ILUVA) with servlet assist, 2000, Society of for computer simulation internal", pp. 1823-1830.

Rogers et al., "Mining GPS Data to Augment Road Model", 1999, ACM Press, pp. 104-113.

Kumar et al., "Integrating geographic information systems, spatial digital libraries and information spaces for conducting humanitarian assistance and disaster relief operations in urban environment", 1999, ACM Press, pp. 146-151.

Moshos J. George, "Analog interpolator for Automatic Control", 1955, pp. 83-91.

B. Meltzer et al., "XML and Electronic Commerce: Enabling the Network Economy," VEO Systems, Sigmod Record, vol. 27, No. 4, Dec. 1998.

R. J. Glushko et al., "An XML Framework for Agent-based E-commerce," Communications of the ACM, vol. 42, No. 3, Mar. 1999.

* cited by examiner

SYSTEM AND METHOD FOR GEOCODING DIVERSE ADDRESS FORMATS

CROSS REFERENCE TO RELATED APPLICATIONS

This application is a divisional of U.S. patent application Ser. No. 10/159,195, filed May 31, 2002, now U.S. Pat. No. 7,039,640 which claims priority to U.S. provisional Application No. 60/295,103 filed on May 31, 2001 by Julia Miller and Chuck Schwerin and entitled "SYSTEM AND METHOD FOR GEOCODING DIVERSE ADDRESS FORMATS," which are incorporated herein by reference in their entireties.

FIELD OF THE INVENTION

Although the development of the Internet suggests that the world is becoming more connected, hence smaller and less dependent on geographical data, in fact the new possibilities enabled by the new technologies make geographic information more valuable. It is increasingly important to develop databases that are compatible with the various diverse formats for street-level addressing to zip codes in use in the world. Geographical information is now playing a major role in providing mission critical information about clients, products, physical assets, and other information that enhances the corporate bottom line. Even consumers who find products on the Internet often want to avoid paying unnecessary tariffs or to locate the closest outlet or service point for a product.

Thus, low cost geographical information, also termed spatial information, is significant for the expansion of commerce and free trade by allowing seamless integration of the various local address formats into an evolving and widely accessible database suitable for integration with other product and service details. Once relegated to the back office and proprietary systems due to complexity and cost, new technologies have enabled integration of spatial information into mainstream Relational Database Management Systems ("RDBMSs"), where it can serve an enterprise business need cost-effectively. Spatial-data-related RDBMSs support storing, managing, accessing, and updating spatial data. The Internet has provoked a steep increase in demand for data, analysis, presentation, and representation with maps/spatial data being but one component. As a result we have seen the introduction of a variety of technology solutions—for example, HTML, XML, ASP, JAVA, and COM—that help meet the demand.

Some of the applications of spatial data include routing, geocoding—the process of generating latitude and longitude information corresponding to a geographical location, reverse geocoding—generating a geographical location, such as an address from corresponding latitude and longitude information, mapping, finding a geographically nearest location of interest, acquiring position, and the yellow pages. Typically, a geocode represents a particular geographic area. Preferably, a grid defined by longitude and latitude coordinates defines a geocode corresponding to a location of interest on the surface of the earth. Alternative examples of geocodes include zip codes as used by the United States Postal Service.

Such spatial data has additional significance. Ready knowledge of the location of its assets, markets, clients, distance and time required for shipping goods, geographic relationships between clients, assets, products, and the like is valuable to a company. The company might be further interested in finding all customers contained within a particular service area for target marketing a new product or service available in that area. For instance, if the service area boundary changes then the customers remaining in a particular service area and the ones moved to a new service area are of interest. Instead of visiting each customer record to determine the new service area, the spatially-enabled system allows one to simply change the service area boundaries, perform a new query with the "contain" or "overlap" function, and let the system do the work for you.

An example of software for associating geocodes with other business data is provided by SpatialWare® from the Mapinfo Corporation which provides spatial data processing within an RDBMS environment. This system creates a tightly integrated solution with the database, allowing the user access to spatial extensions within the normal database environment and its tools. Thus, users and administrators can perform the majority of database tasks, such as determining driving directions to a desired destination, from within the normal tools provided by the database vendor.

Another example of spatial data applications is provided by mobile location services for locating and servicing customers on the move. With the aid of such capability, one may offer a discount to customers who happen to be within a defined distance of a store via a wireless device; or survey people for their responses or recollections of a significant event within a defined distance and time of the event taking place. In such applications it is important to rapidly locate a customer and estimate the layout of a particular geographic area. In an example of applying spatial technology, an insurance company could rapidly determine the addresses and identities of its customers affected by an event of interest and respond rapidly to provide customer satisfaction with lower transaction costs. Other applications include preparing dynamic and interactive maps representing prevalence of cancers and other diseases provided online, or designating areas for a franchise to best cover a targeted market, making maps for a new area, and the like. In these and other applications, the use of sufficiently well resolved geocodes, in general, is superior to relying on mere addresses (even with zip-codes) since rapid and effective search techniques available at a desired spatial resolution, e.g., using a suitable R-tree (described below).

Locating an address, or any other object of interest, or a customer can be accomplished by generating a geocode, e.g., a latitude and longitude specifying a position on the surface of the earth, or a postal code, such as the United States Postal Service Zip code, and other variants. Creating a displayable map corresponding to a collection of geocodes involves associating a graphical display object (such as point objects, line objects and area objects) with a geocode. Displaying an ordered set of graphical objects corresponding to selected geocodes renders a corresponding map to a user. Examples of such maps include the familiar driving directions for going from one location to another that are now available for most regions in the United States. These are, not surprisingly, often found in conjunction with Internet sites providing advertising or location information.

All of the above applications require not just cataloging, but also looking up spatial data repositories. Spatial data can be advantageously indexed or otherwise organized to enable efficient searches. For instance, the R-Tree index organizes records by the geographic extent of each object. Objects can be grouped together and described as being contained within a larger rectangular space. The size of each space is dependent upon the number of objects in that space. As the number of objects increases, the space can be further split into two or more sub-spaces, thus reducing the number of objects in each new area. The process continues until the entire geographic extent of the data is covered, and the number of objects related to each area is approximately equal.

Underlying all of these applications is the need to collect and organize geographical information. Preferably, addresses and maps corresponding to the entire world need to be entered into a suitable database in view of the increasingly integrated world economy and the global reach of the Internet. Typically, a geocoding engine is implemented in a client-server architecture to respond to a request for one or more geocodes corresponding to a particular address. In the alternative, such an engine may be provided geocodes and a corresponding address requested. Not surprisingly, such a system has to be scalable to maintain responsiveness under the load of multiple concurrent requests.

The extraordinary diversity of the formats for addresses in the world (with multiple geocode formats within even a single nation) along with the various languages in use presents a formidable problem in constructing and deploying a common geocoding engine. Since a request to obtain a geocode corresponding to an address in one nation may be received in another nation with a different addressing system, or even language, integration of all of the geographical information of interest is difficult with many nations being too small for a dedicated geocoding engine while others are too diverse to be served by just one conventional geocoding engine.

Cost effectiveness requires efficient geocoding engine(s) that can handle diverse types of geocoding requests. This goal introduces performance penalties since the different address formats increase the computational overhead both while retrieving addresses (or geocodes) from a database and in building or updating the database itself. Alternative addresses present yet another challenge since it is possible, even within the same system, to specify an address in more than one way based on little more than personal style. In addition, partial addresses and degenerate addresses, e.g., multiple cities and streets with the same name or similar names require an efficient look-up strategy to identify a best match. Examples include the many ancient cities referred to by their various names such as Varanasi, INDIA is also termed as Kashi, INDIA, or Benaras, INDIA. This diversity is compounded by the deliberate changes in names of cities or streets in response to political pressures.

SUMMARY OF THE INVENTION

The present invention provides a system and method for handling and communicating geocoding requests seeking or updating spatial information. The disclosed method provides geographical information to a plurality of users employing a plurality of formats by encoding geographical data to generate default data in a parent class that may be customized via an overriding sub-class. The class implementing parser, matcher, interpolator or data access is preferably determined based on a country code in the request. This country code may be explicitly or constructively specified with appropriate defaults allowed.

A geocoding engine constructed in accordance with the invention reduces the overhead while providing for coordination in handling requests containing multiple address formats and updates in spatial information. A single geocoding engine is capable of handling requests comprising a variety of address formats and constraints. The engine preferably includes modules for detecting a country code designation, invoking a parser corresponding to a country code, detecting a postal code, detecting a world city name in the received request, obtaining a candidate list, invoking a matcher module for evaluating the candidate list, and invoking an interpolator for generating a geocode corresponding to a selected candidate.

A system in accordance with the invention provides spatial information to a plurality of users with the aid of a generic Matcher module, a customized local Matcher module, a generic interpolator module, a customized interpolator module, one or more servlets for managing local requests by preprocessing and forwarding input received from and output sent to a client. The geocode engine coordinates Interpolator, Matcher and databases by determining whether customized data is available in preference to default data.

Advantageously, a multithreaded design is employed to provide a stable implementation that can process and allocate resources for batch as well as individual requests. Moreover, communication of geocoding requests, data and results is facilitated by the use of XML code words disclosed herein, i.e., elements and attributes for communications across networks.

DETAILED DESCRIPTION OF THE DRAWINGS

FIG. 1 schematically illustrates the architecture of an exemplary computing environment for practicing the invention;

DETAILED DESCRIPTION OF THE INVENTION

Figure 1:
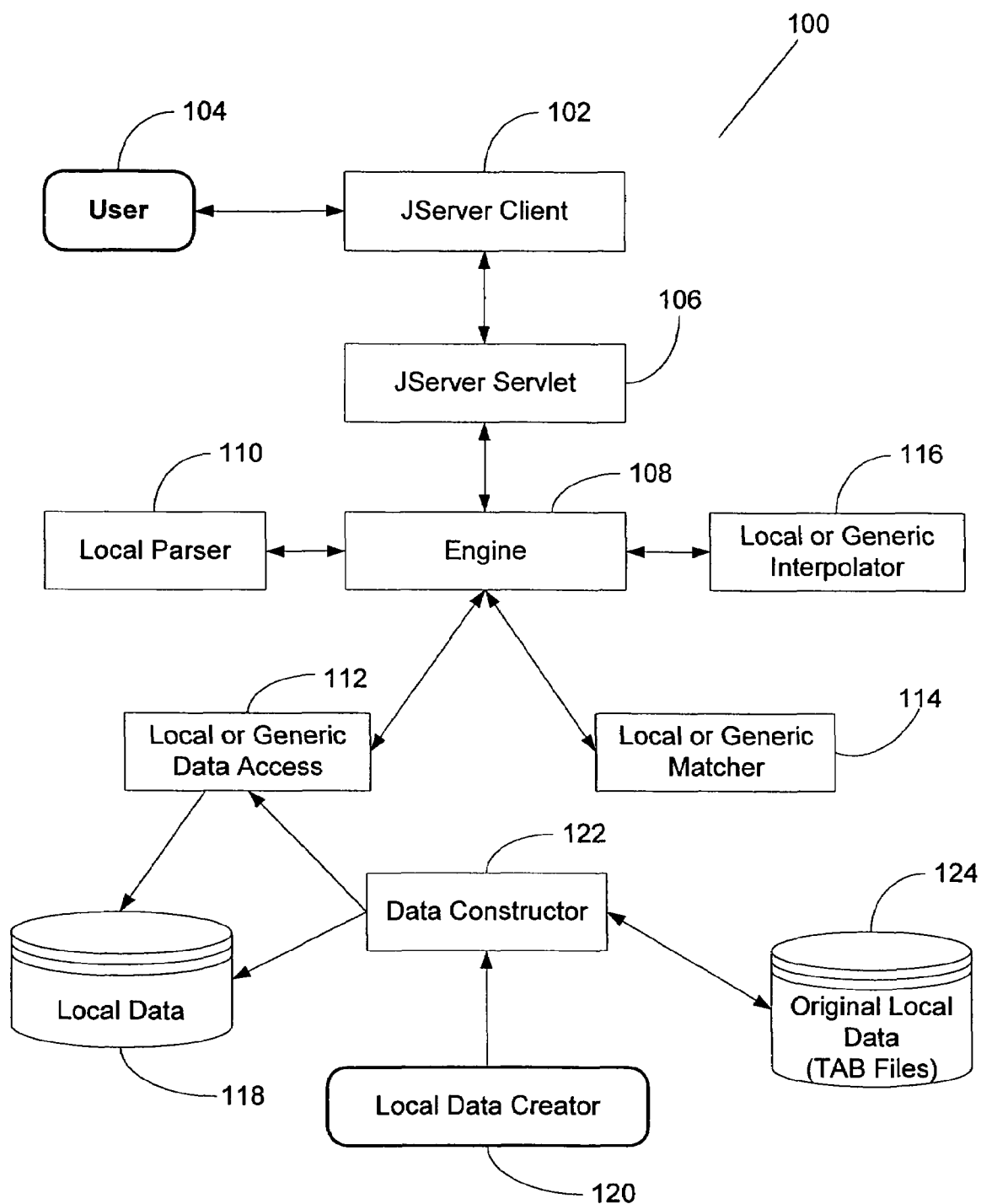

The invention provides a system and method for geocoding on a wide variety of platforms and processing international address data in a variety of formats. A preferred embodiment of the invention executes on any platform providing support for the widely available JAVA virtual machine ("JVM").

The invention provides a JAVA-based geocoding solution that is portable and suitable for international geocoding. Use of a flexible binary data format allows any type of address data to be stored. In addition, a data creation utility provides international users with a method to put country-specific data in the binary format available for use in geocoding with a minimum of additional effort.

An embodiment of the invention creates a multi-threaded, platform-independent geocoding engine, written entirely in Java, incorporating worldwide (generic) components for address matching, parsing and interpolating, a data access component that enables it to read addresses from a database in a binary format, as well as country-specific Java classes whose address rules supercede those of the worldwide classes. An example organization of a database is to store data in data structures (such as folders/objects) corresponding to the country code to ensure consistent retrieval of the data. Moreover, the data structures may in some embodiments be organized to allow overriding subclasses to update the data or organized in databases with the country codes as keys for searching and accessing the data.

It is desirable that modifications of, or extensions to, a geocoding engine allow continued use of existing Geocoding API (Application Programming Interface) specifications. At the same time these are necessarily modified to handle additional requirements imposed by the increased diversity in the address types handled both by supporting partial or alternative addresses and International addresses. The disclosed invention allows construction of embodiments that are suitable for continuous modifications in a constantly changing world. The efficiency gained by the use of fewer geocoding engines to handle diverse address types in queries enables better service.

In another aspect, it is desirable that a geocoding engine be capable of being implemented on machines supporting single-or multi-threaded computations. A thread safe design not only makes the engine stable, but also allows multiple requests to be dispatched concurrently, thus requiring fewer engines to service a large volume of geocoding requests. Moreover, the engine may be implemented on machines having more than one processor.

In another aspect, a geocoding engine in an embodiment of the invention, is capable of further efficiency by geocoding a single address or accepting and geocoding a batch of addresses. This reduces the volume of independent requests and makes the task of obtaining geocodes or updating databases easier for remote users of the geocoding engine. Moreover, batch geocoding requests can be better processed with improved allocation of resources in a multi-threaded design.

FIG. 1 illustrates an example system 100 for an embodiment of the invention. JServer Client 102 receives input from User 104 and communicates it to JServer Servlet 106, preferably in extensible Markup Language ("XML"). Jserver Servlet 106, in turn, communicates with (geocoding) Engine 108. Engine 108, in response to the specified (or default) country code causes the user input of an unrefined address (UnrefinedAddress) to be parsed by a parser corresponding to the country code. The country code specific parser, e.g., Local Parser 110, parses the input address for further processing by Engine 108. In the absence of a local parser, a generic parser is used. Notably, in the example system of FIG. 1, a generic parser is used for isolating city, country and postal code information.

Although, in the example embodiment, spatial information is as limited as the geocode point passed as a response to a geocoding request, additional spatial information may be included in alternative implementations. It should be noted that spatial information is readily transmitted after encoding in XML since there are available definitions for simple geometric objects suitable for geographical information in the form of the Geography Markup Language (presently in version 2 and available from http://www.opengis.net/gml/01-029/GML2.html at the time of filing of the application) that is incorporated herein by reference in its entirety. Thus, coordinates, shapes such as streets, blocks and the like are readily communicated via XML (i.e., GML) across networks without requiring extensive resources associated with images in general. In addition, elements have been defined to better manage communications over the network for more particular operations and parameters than general geographical information.

Some particularly suitable XML elements, the names and parameters, and their special values presented as attribute list (!ATT LIST), introduced for handling such information are described in Appendix A. An example non-exhaustive set of such XML elements, one or more of which may be employed to transmit geocoding information, consists of XML comprising at least one of the members of the set of elements consisting of RequestEnvelope, ResponseEnvelope, USA_GeocodeRequest, USA_ParsedAddress, USA_StreetAddressData, AddressNumber, PreDirectional, PostDirectional, StreetBase, PreThoroughfareType, PostThoroughfareType, USA_GeocodeConstraints, AddressConstraints, AddressCloseMatchConstraints, MustMatchHouseNumber, MustMatchStreet, MustMatchZipCode, MustMatchCity, MustMatchInput, SearchRadiusExtension, DistanceFromCorner, DistanceFromStreet, ZipConstraints, GeographicAreaConstraints, GeographicAreaCloseMatchConstraints, MustMatchUrbanization, MustMatchCounty, MustMatchState, PointOfinterestConstraints, CASSConstraints, USA_ResponseConstraints, MaxCandidates, SuccessResponse, FaultResponse, USA_GeocodeResponse, USA_GeocodeLocationList, USA_GeocodeLocation, USA_GeocodeFaultResponse, FaultMessage and FaultCode.

XML elements may also be viewed in the context of their function and/or implementation. In accordance with such an example classification scheme XML elements may be described as belonging to one or more of the following categories:

Package information, which includes elements such as RequestEnvelope, ResponseEnvelope, GeocodeRequest, SuccessResponse, FaultResponse, ResponseCode, Message, GeocodeSummary, RequestResult, and GeocodeRequestType.

Generic address components, which includes elements such as InputAddress, Address, AddressConstraints, AdditionalFields, AddressNumber, AreaName1, AreaName2, AreaName3, AreaName4, Country, GenericField1, GenericField2, GenericField3, GenericField4, MainAddress, placeName, postAddress, postCode1, postCode2, postDirectional, postThoroughfareType, preAddress, preDirectional, preThoroughfareType, unitType, unitValue, and Candidate, unitsOfMeasure. These elements assist in communicating information about various administrative designations in an address of interest.

Response Constraints, which includes elements to help tune the scope and nature of the geocoding process. Some example elements include as ReturnCloseMatchesOnly, IncludeRequest, IncludeParsedAddress, IncludeActualConstraints, MaxRanges, maxCandidates, offsetFromCorner, offsetFromStreet, and CoordinateReferenceSystem.

Matching constraints dictate the restrictions placed on the generation of the requested geocodes typically to avoid waste of resources and/or ensure a best match. Examples include elements such as FallbackToPostalCentroid, closeMatchesOnly, fallbackToGeographicCentroid, GeocodeConstraints, BaseConstraints, and AdditionalConstraints.

Matching quality information, which includes elements such as addressNumberMatched, areaName2Matched, areaName1Matched, areaName3Matched, areaName4Matched, countryMatched, genericField1Matched, genericField2Matched, genericField3Matched, genericField4Matched, postCode1Matched, postCode2Matched, streetNameFieldsMatched, placeNameMatched, matchprecision, TotalLocationsFound, TotalLocationsReturned, and TotalCloseMatchesFound.

DEU Country specific address components, which includes elements related to specifying German addresses. Similar country specific address components are possible for other countries with each potentially meriting such individualized attention within the dame geocoding engine setup by the methods and system of the described invention as DEU_AddressData, Hnr, Postfach, Pirma, Str, PlzOrt, DEU_AddressGeographyData, PLZ, Ort, Country, MustMatchPlz, MustMatchHnr, MustMatchOrt, MustMatchStr, MustMatchInput, DEU_GeocodeFaultResponse, DEU_GeocodeLocationList, DEU_GeocodeLocation, DEU_GeocodeResponse, DEU_GeocodeLocationList, DEU_ParsedAddress, and DEU_GeocodeConstraints.

It should be noted that the listed elements along with their attributes are illustrative and not exhaustive. Moreover, variations without departing from the spirit of the invention are intended to be included within the scope of the invention.

Notably, response to a successful geocode request includes a response without any candidates since a correctly formed request that generates no candidates is not considered a fault. In a preferred embodiment, response to a geocode request containing a fault is handled differently by throwing an exception. In this context a fault means that there was a condition that prevented the geocode engine from running.

The proposed XML elements have the advantage of communicating geocoding requests, the form of envelope desired for sending or receiving a request, the data relevant for making particular requests, and constraints on both the requests and results that a user may desire to impose. Appendix B to this disclosure includes a description of JAVA based classes for a possible implementation of an embodiment of the invention.

Figure 2:
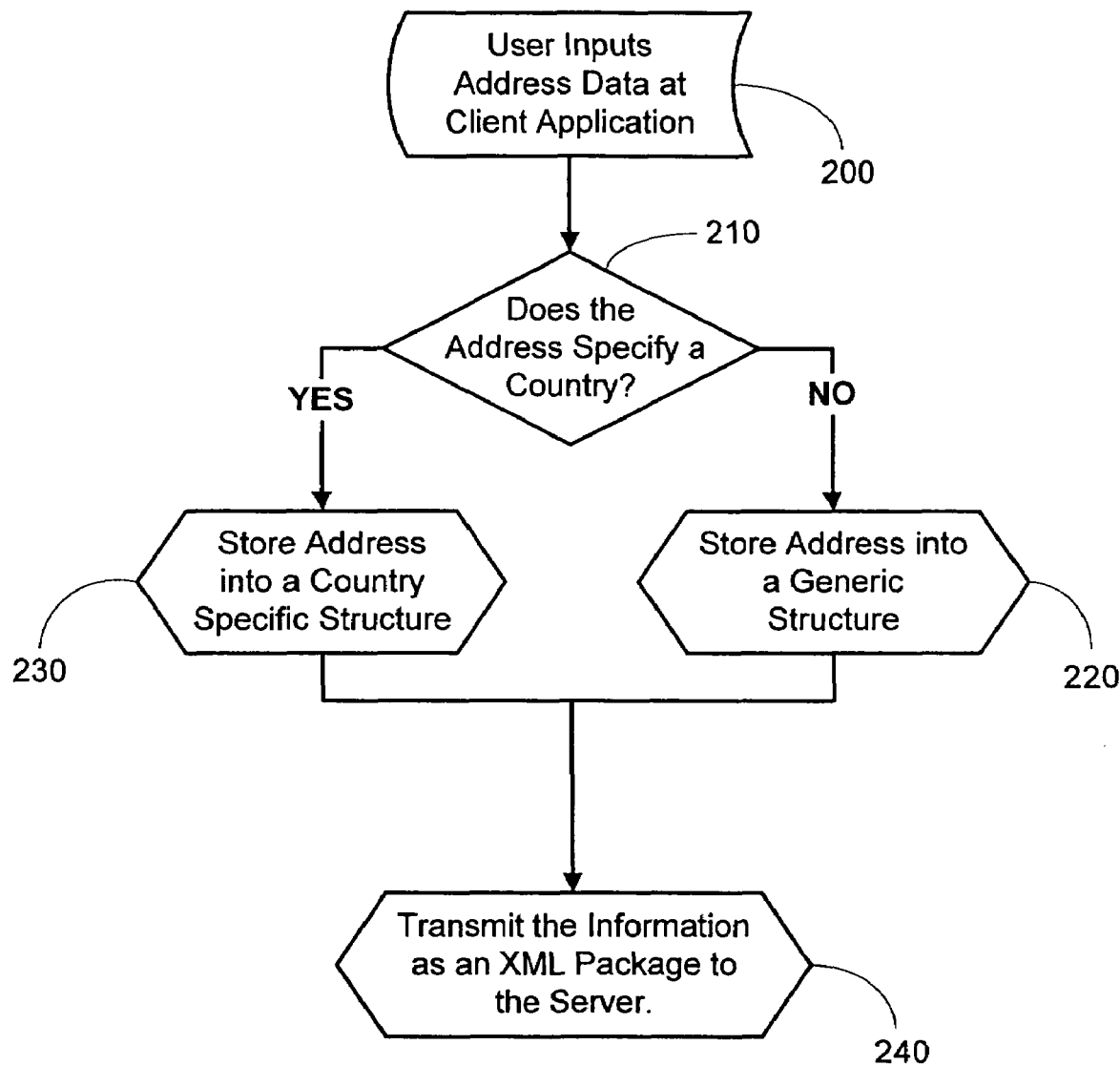
FIG. 2 illustrates steps for providing address information in a geocoding request.

FIG. 2 illustrates steps in processing a user initiated request in a system similar to that illustrated in FIG. 1. During step 200, a user, e.g., User 104, inputs a request containing address data in a client application, e.g., JServer Client 102. Next, during step 210 the request is evaluated to determine whether it contains a country code. If a country code is detected then the address data is stored in a country specific data structure during step 220. If the country specific data structure is not found, such as for an invalid country code, then in a preferred embodiment control passes as if the country code was not specified and a default country code is employed. Alternative embodiments may generate an error message by throwing an exception or create a corresponding data structure among many possible actions. Otherwise, the address data is stored in a generic data structure during step 230. Control from steps 220 and 230 then passes to step 240 wherein the address data is encoded in XML and transmitted to the Server from the client.

User 104 may also specify parameters associated with the address specification. Not all data retrieved from Data Access 112 (for instance Local.Data 118, that preferably reflects local, country specific features) will satisfy the specified geocode constraints. Consequently, the retrieved data is subject to processing by Matcher 114, that is preferably also specific to the country code, although a generic matcher is available for customization. This specificity allows for inclusion of local address peculiarities into the matching process by allowing scoring of meaningful matches with lower computational and maintenance overhead while ensuring easy upgrades. The output of Matcher 114 is further processed by Interpolator 116, that is also built by further customization of a generic version to obtain local version.

The system also includes one or more facilities for inputting data for continued upgrading and expansion of the range and types of geocodes and addresses. Accordingly, for instance, Local Data Creator 120 collects address data and geocode data that is input, for instance optionally as an XML message, to Data Constructor 122. It should be noted that a geocoding engine does not require data encoded in any version of XML. Indeed, data creators may choose any data encoding format. XML provides an increasingly popular means for communicating data to the geocoding engine and receiving data from the geocoding engine. Data Constructor 122 can also retrieve existing data in TAB format from Original Local Data 124. Data Constructor 122 then provides data to build Local Data 118 that is particularly useful in contexts of interest. The country code specified in a user input allows navigation of data to locate data corresponding to the country code. In the absence of a country code, generic data access is still possible with the aid of a default country code assignment.

The format of the data is flexible and may be changed in different implementations of the invention without departing from the invention. The use of a preferred binary format to represent data provides security by making the data less transparent while reducing the need for separate encryption of data during transmission or storage. This format also satisfies international encryption requirements as well as maximizes geocoding speed. The design of customizable parser, matcher, interpolator and data storage with the aid of JAVA classes allows use of small footprint implementations that are further customized by merely overriding a parent class to introduce new data or functionality, hence customization reflecting a country or political changes.

This flexibility allows capability for geocoding at postcode, city, street, point of interest level, or any other geographic centroid level. Advantageously, the Geocoder assumes that a country code is one field being passed in unless a default code exists in metadata. Moreover, a country code need not be provided if all addresses exist in the same country or satisfy the same addressing pattern or if geocoding is based on recognizing names of cities, particularly well-known cities.

As described above, a geocoder consists of several modules, including a parser, a matcher, an interpolator, a data access piece, and the geocoding engine. Although a Graphical User Interface ("GUI") is not required, it is advantageous to include a GUI for a more user-friendly product design. A Java GUI is preferred to the continued use of Windows GUI to ensure portability of the product across various platforms. Moreover, users of a Java GUI may optionally connect via JServer Client 102 and JServer Servlet 106 or directly to Engine 108 via an API.

Different versions of the geocoders may be limited to one or a few countries, including for the purpose of testing without departing from the spirit of the invention. Moreover, the geocoding ability may be restricted such as in only providing address and postal geocoding.

Preferably the GUI for the Local Data Creator 120 is separate and need not be available to the typical user, e.g., User 104. The data creation routine is, among other things, useful for creating data for a particular country. Subsequently, such data may be packaged in an integrated product. Of course, some users may also want the data creation portion in order to create their own data files. The data creation utility is independently useful for setting up localized data, for instance a customized dictionary functionality.

For country data in TAB format the data creation utility has an interface that enables data creators to describe the structure of the data. Accordingly, a data creator, e.g., Local Data Creator 120 of FIG. 1, indicates columns for street, segment, range and unit portions of the street data, as well as centroid information, mapping of geographic areas to search area codes, and so forth.

Typically, the parser accepts an UnrefinedAddress object and return a ParsedAddress object. In view of the diversity of address formats in the world, there is no generic address parser. Therefore, a suitable parser has to be created or instantiated for each country or jurisdiction(s) sharing a common addressing format. In the absence of a specified country, a default country specification may be employed to invoke a default parser.

To add a new country, data is preferably created from TAB files using the data creation utility. An address parser is also provided along with the creation of a country-specific version of GeocodableAddress that indicates the parser to be used. Moreover, the existing Data Manager, Matcher, Interpolator, and CandidateAddress are usable for the new country or further customization is possible by subclassing them to enhance or change the default functionality.

The data constructor, e.g., Data Constructor 122 of FIG. 1, also creates a country-specific GeocodableAddress object, such as a USAGeocodableAddress object corresponding to USA. This object can use all the methods of the base class and provides a constructor as well as sets the parser class name. Of course, GeocodableAddress functionality can be further extended or changed with no loss of generality.

In another aspect J Server servlets, e.g., JServer Servlet 106 of FIG. 1, may pass requests off to specialized servlets depending on type (e.g., the street address geocode requests may be handled by a servlet different from that handling a postal centroid request). These specialized servlets each have their own process space, and each servlet has its own DataManager. The number of such specialized servlets is small. Moreover, they may be on different machines providing a natural network-compatible implementation. In this regard it should be noted that functionality of Servlet 106 of FIG. 1 includes the functionality of the specialized servlets described above.

The first request from a servlet to the engine classes causes the DataManager for the local data to be started with concomitant reduction of waiting time for users due to initialization of the DataManager. Once created, the DataManager is available for subsequent calls without further initialization.

Advantageously, user preferences are communicated by use of a GeocoderConstraints object that itself may be customized for each country. As the engine receives a request from a user, it first invokes the parser, then the DataManager to get candidates, the Matcher to rank the candidates and finally the Interpolator to position the points for providing a result to the user.

As previously described, for extending the default functionality of the geocoder or changing default behavior, a localizer has the option of extending the provided classes. CandidateAddress can be extended to hold specific data or just to access the generic data differently (for instance, getStreetName instead of getString(3)).

The matcher can be extended to customize how matching is done, instead of just checking exact match on fields. For example, if the street type does not match but everything else does, some users may want to consider this a better match than one where the house number is incorrect but everything else matches.

If there are special rules for house positioning on a street, the localizer may wish to derive a specific Interpolator to customize the placement of points.

Similar customization is possible for the DataManager as well. By default, the GenericDataManager class assumes that data for country XYZ may be found in the XYZ subdirectory off the main data path. But in some cases there are further refinements. In the US, for instance, one DataManager may handle addresses in Puerto Rico while a second DataManager stores data for addresses in the rest of the country. The two DataManagers would have separate data directories, and the data may contain different columns, metadata, and versions.

Alternatively, a DataManager may check a special file to obtain additional information for an address, such as the US unique ZIP Code category.

An example of a JAVA based functionality is the Mapinfo™ corporations's MapXtreme™ Java functionality for reading TAB files, modifying tables, databases, and so forth. This MapXtreme™ Java functionality is also suitable for use by the data creation module to read the TAB data files.

Figure 3:
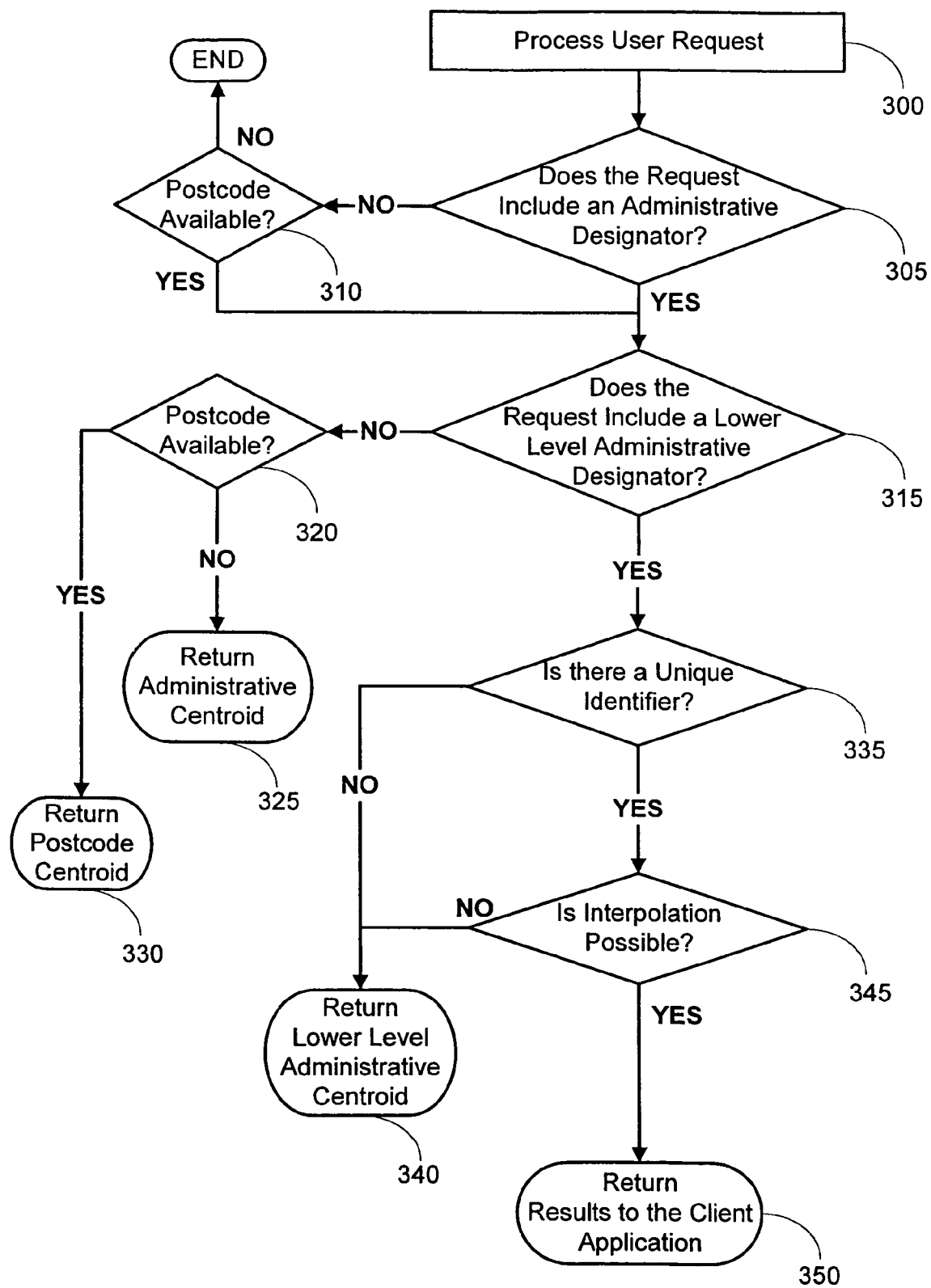
FIG. 3 illustrates example steps for processing a geocoding request.

FIG. 3 illustrates an example set of steps for processing a geocoding request. An address in a request, when completely specified includes lower and higher level administrative designators. A lower level administrative designator is, for instance, a street, block number, or similar naming scheme. A higher level administrative designator, usually simple an administrative designator, is typically a city, town, or similar organized settlement. It is possible to provide geocoding centroids corresponding to the postal code, the administrative designator, or even the lower level administrative designator in response to requests providing various levels of information in the many possible fields in a request.

Accordingly, during step 305 if there is not administrative designator, e.g., no city is specified, then the control goes to step 310 for testing for the presence of a postcode. Since a postcode typically may also function as an alternative administrative designator, if there a postcode detected, control passes to step 315. However, if there is not postcode specified then the method terminates, possibly with a fault being communicated to a user. In alternative embodiments, a well-known lower level administrative designator may be sufficient to allow further processing (not shown), but typically in the absence of an administrative designator and a postcode, the method ends.

If a postcode or an administrative designator is available, then control passes to step 315 for identification of at least one lower level administrative designator. If there is no lower level administrative designator, then control passes to step 320. During step 320 if a postcode is available then a centroid corresponding to the postcode is provided as the corresponding geocode during step 330. If only the administrative designator is available then, the administrative centroid is provided as the corresponding geocode during step 325.

If a lower level administrative designator is available, then control flows to step 335 to identify any unique identifiers. Examples of unique identifiers include house numbers/identifiers, names of buildings, landmarks, and the like. In the absence of any unique identifier, control flows to step 340 for providing a lower level administrative centroid as the corresponding geocode to the user. On the other hand if one or more unique identifiers are available then the need and possibility of performing an interpolation operation is evaluated during step 345. If interpolation is feasible, then the geocode incorporating interpolation (if desirable) is provided as a response during step 350. However, if a precise geocode is not available and no interpolation is possible then control flows to step 340 to provide a lower level administrative centroid as a geocode.

Figure 4:
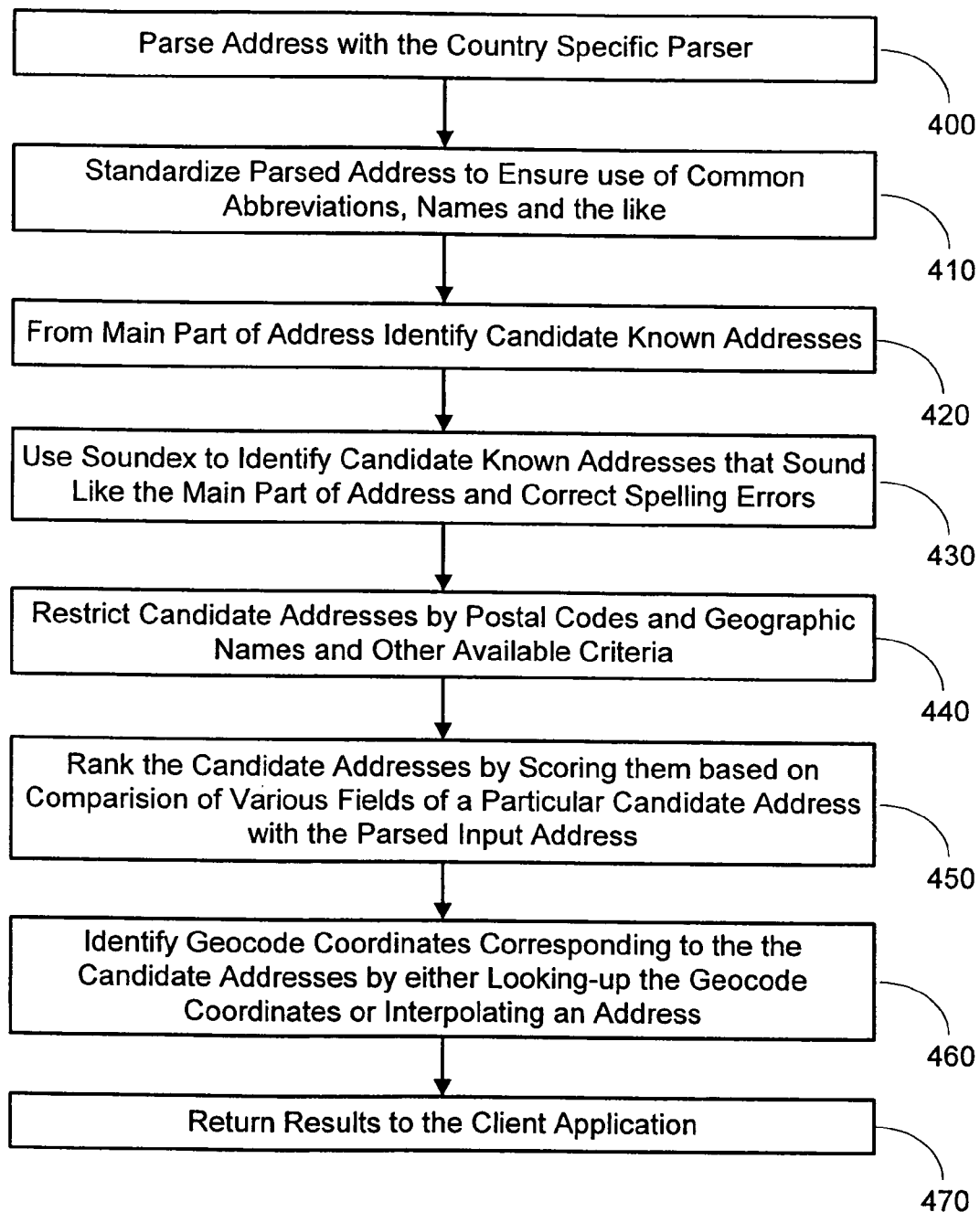
FIG. 4 illustrates exemplary steps for processing a street level geocoding request.

FIG. 4 further illustrates some exemplary steps for street-level geocoding. During step 400, the input address is parsed by a country-specific parser to generate a parsed address object, i.e., the address is divided into significant pieces that may, for instance, be treated as attributes or fields for searching a database. In an embodiment of the invention, an UnrefinedAddress object is processed by a parser to generate a ParsedAddress object. Both UnrefinedAddress and ParsedAddress are subclasses of WorldwideAddress class that extends java.lang.Object. The WorldwideAddress class defines an Address interface to provide a generic address structure. The Address interface has a number of accessor (get and set) methods for managing various parameters such as country code, thoroughfare and the like. Moreover, the accessor methods can vary by the particular country as subclasses of WorldwideAddress.

Next, during step 410, this parsed address object is then processed to standardize it to ensure use of standard abbreviations, names and the like. During step 420 candidate addresses are identified, e.g., by searching Local Data 118 of FIG. 1. During step 430 Soundex is used to identify addresses that sound like the main part of the address and to correct errors. In an embodiment of the invention, the capability to sound out addresses is provided by abstract class Soundex that extends java.lang.Object. This abstract class defines what a Soundex object can do. Each locality, i.e., country, either has a new corresponding Soundex object or is associated with an existing object. These locality Soundex objects should be in the country package, with the language mentioned in the name such as USAEnglishSoundex, USASpanishSoundex, CANFrenchSoundex, CANEnglishSoundex and the like.

Address matching preferably further includes restricting candidate addresses by user-specified or other geocoding constraints during step 440. For instance, only candidates within a specified postal code may be acceptable. The identified candidate addresses are ranked, during step 450, by scoring the extent of match between various fields of a candidate address and the input address. Next, during step 460, geocode coordinates corresponding to the candidate addresses are determined by looking up a database and/or using an interpolator, e.g., Interpolator 116 of FIG. 1, to estimate geocodes from known geocodes if a precise geocode for the address is not readily available. Finally, during step 470, the results are provided to the client application after encoding in XML.

Figure 5:
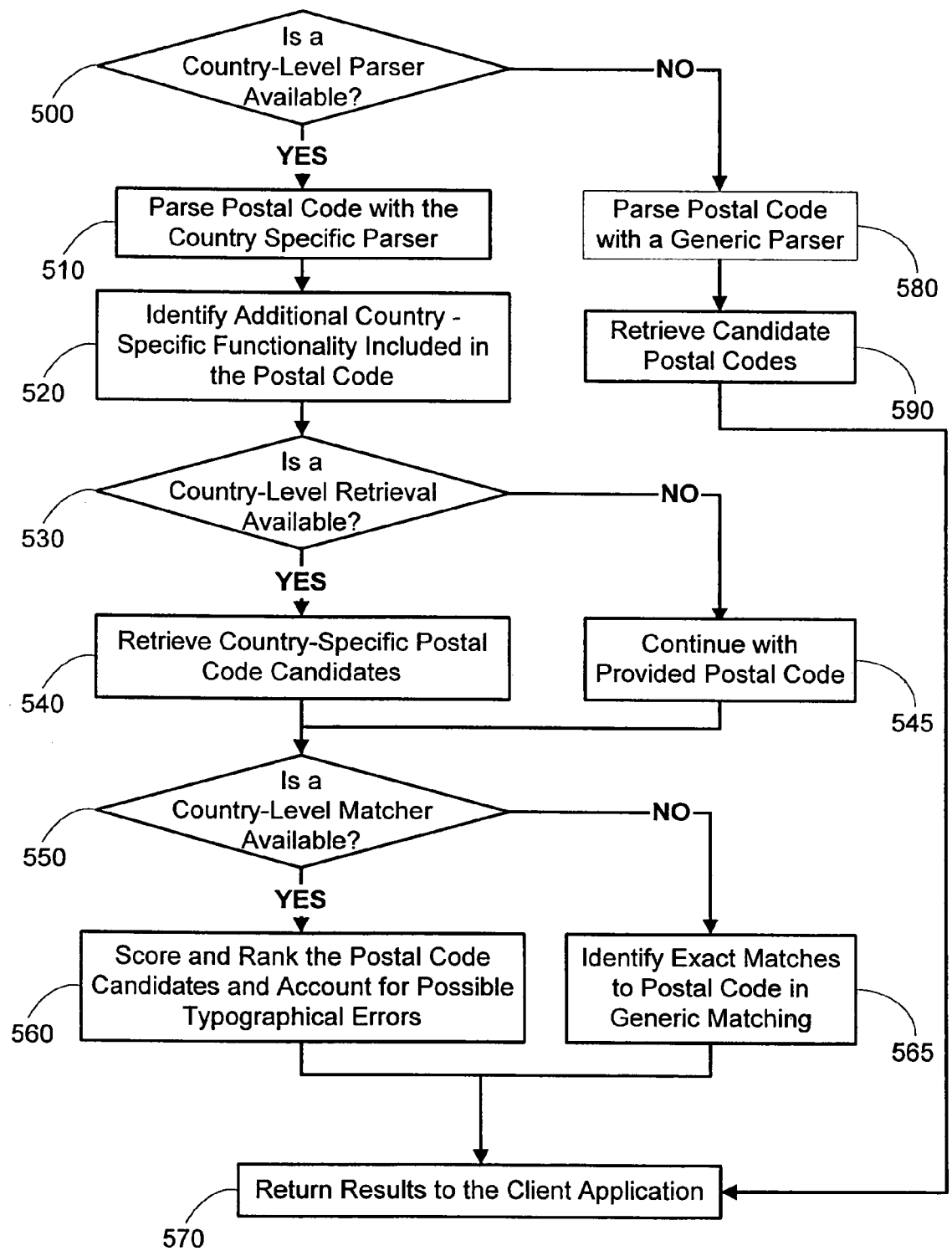
FIG. 5 illustrates exemplary steps for processing a postal-code level geocoding request.

FIG. 5 illustrates exemplary steps for geocoding at the postal code level. Postal-code-level geocoding includes attempts, if possible, to correct typographical errors in postal codes and the like to identify exact and close matches. The fallback position is to require exact matches to the provided postal code. Accordingly, during step 500 if a country-specific parser is available, control is passed to step 510 for parsing the postal code with a country-specific parser. Next, during step 520, additional country-specific functionality included in the postal-code is identified. During step 530, if a country-specific retrieval is possible, then control passes to step 540 for retrieval of additional country-specific postal-code candidates and then onto step 550. Otherwise, control passes via step 545 to step 550 for continued use of the provided postal-code in the user input.

If a country-specific matcher is available then control passes to step 560 for ranking of postal-code candidates and correcting/accounting for possible typographical errors in the specified postal-code followed by control passing to step 570. Otherwise, during step 565 only exact matches are processed and during step 570 results are provided to the client application.

In the absence of a country-specific parser for identifying relevant parts of a postal-code control passes from step 500 to step 580 for parsing with a generic parser followed by a retrieval of postal-code candidates during step 590 and sending results to the client application during step 570.

Figure 6:
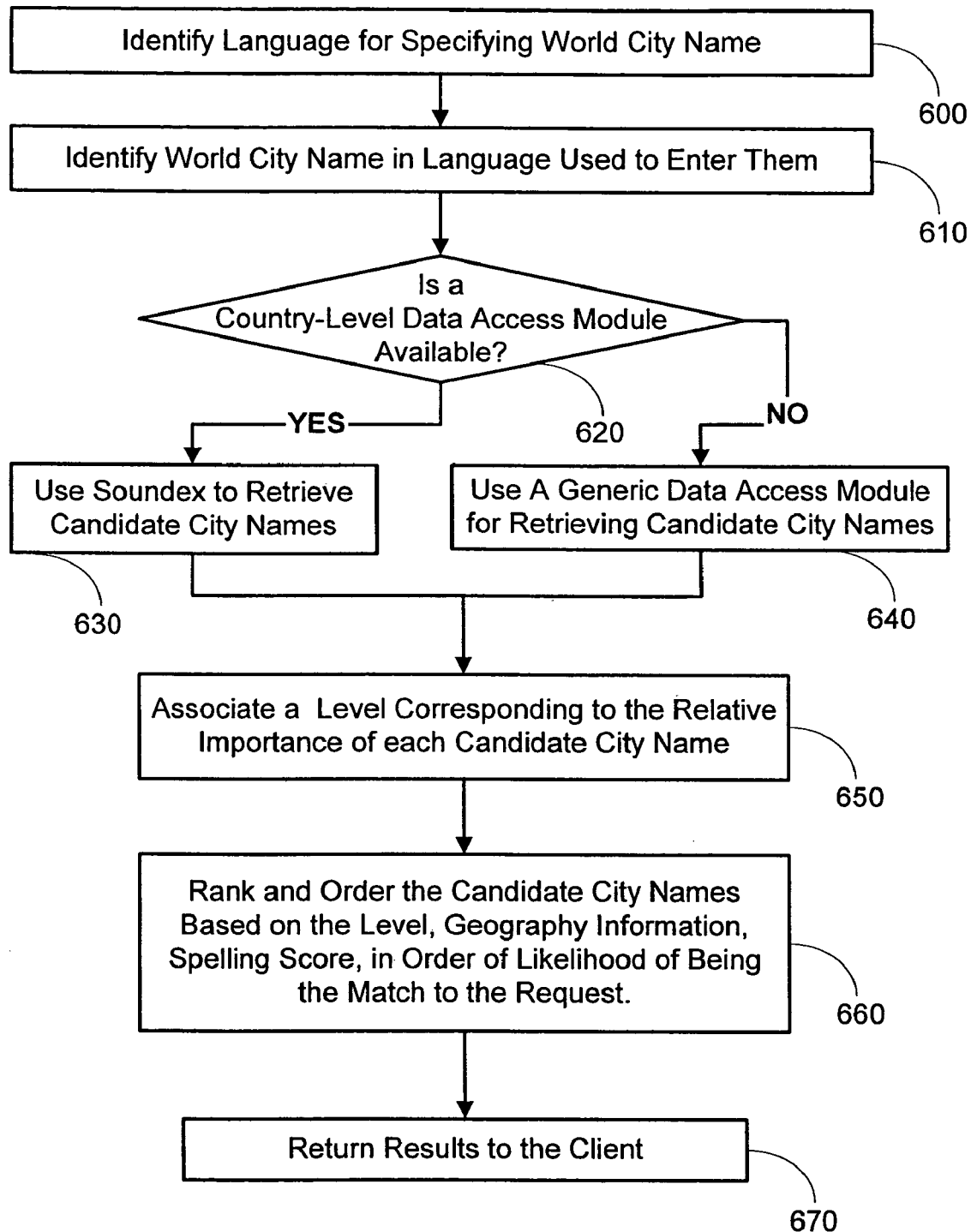
FIG. 6 illustrates exemplary steps for processing a world city level geocoding request.

FIG. 6 illustrates some exemplary steps for major city level geocoding described in FIG. 2. During step 600 a language used to specify a world city name is identified. Next, during step 610, the world city name is identified in the language used to enter it in the input address with control passing to step 620. If country level data access is possible, then control passes to step 630 during which Soundex and other country-specific aids enable retrieval of candidate city names. Otherwise, control passes to step 640 during which a generic data access allows retrieval of candidate city names. Control passes from steps 630 or 640 to step 650 during which the candidate city names are associated with a level of importance. Then, during step 660 the candidate city names are preferably, but not necessarily, ranked and ordered based on level, geography, spelling and the like. Thus, for instance, in a preferred embodiment cities such as Paris, Tex. are likely to be ranked below Paris, France. Finally, during step 670, results are returned to the client application following encoding in XML.

FIGS. 3-6 illustrate the use of Candidate retrieval with the aid of country-specific data access. Such access enables the use of Soundex and similar techniques to correct possible spelling errors in processing partial or even incorrect address input by a user. For each candidate retrieved, matching allows scoring of various sub-fields with a weight attached to the comparison with the input address. Combined with the standardization described previously to ensure uniformity of abbreviations, spelling and the like, the tolerance for various forms of the same input address is increased to provide a friendlier and more useful tool. Moreover, the use of JAVA and XML allows use of the software not only on various machines, but interactively over networks without requiring extensive processing by intermediate nodes. Geocoding services can be offered on a global scale in accordance with the invention to meet various business and personal needs.

The handling of postal-codes, a type of geocode themselves, to generate corrected postal-codes and geocodes in the form of specified geographic coordinates such as longitudes and latitudes, e.g., of the centroid of the area covered by the postal-code, allows translation between different types of geocodes.

Figure 7:
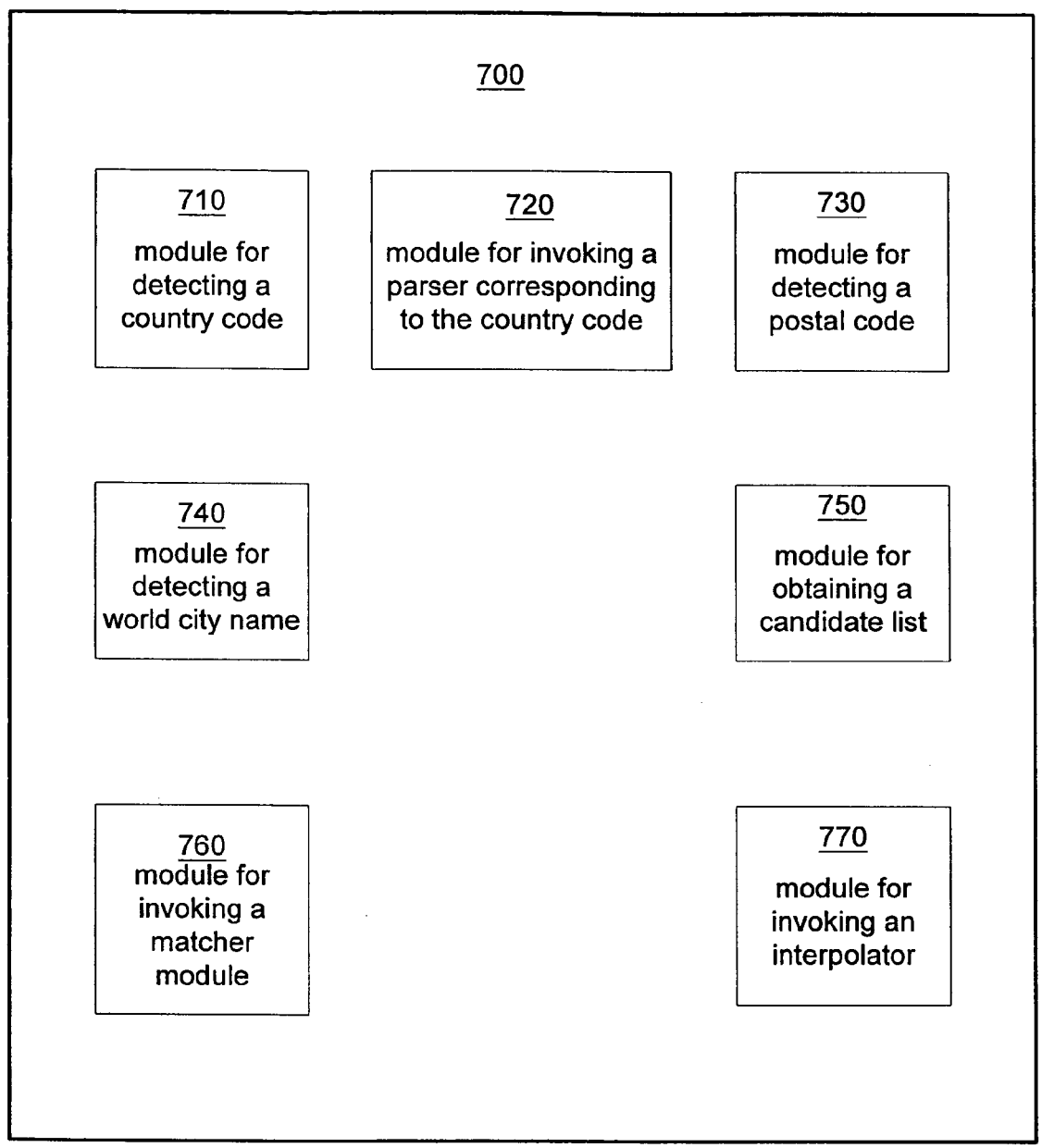
FIG. 7 illustrates an exemplary geocoding engine.

FIG. 7 illustrates an exemplary design for a geocoding engine. Geocoding engine 700 provides geocodes in response to receiving address information from a remote user. This address information is preferably communicated encoded in XML and is associated with a default or explicit country code designation detected by a module for detecting a country code 710. For customized handling of a request, the engine includes a module for invoking a parser corresponding to the country code 720 to provide a parsed input address that best reflects meaningful sub-parts of the received address. Modules for detecting a postal-code 730 and detecting world city names 740 in the received geocoding request allow processing of the request by generating candidates via a module for obtaining a candidate list 750 corresponding to at least one member of the set consisting of the postal-code, the parsed input address, and the world city name. This candidate list is further evaluated as a result of a module for invoking a matcher module 760 preferably invoking a matcher module corresponding to the country code. As previously described, matching may also correct errors by aid of Soundex and a consideration of alternative names and the like. Upon matching, the various members of the candidate list are scored and ordered with geocodes retrieved for the best match(es). These geocodes are obtained, if required, with the aid of a module for invoking an interpolator 770 corresponding to the country code. The interpolator uses known geocodes to generate a geocode corresponding to a selected candidate in the vicinity of the known geocodes.

Figure 8:
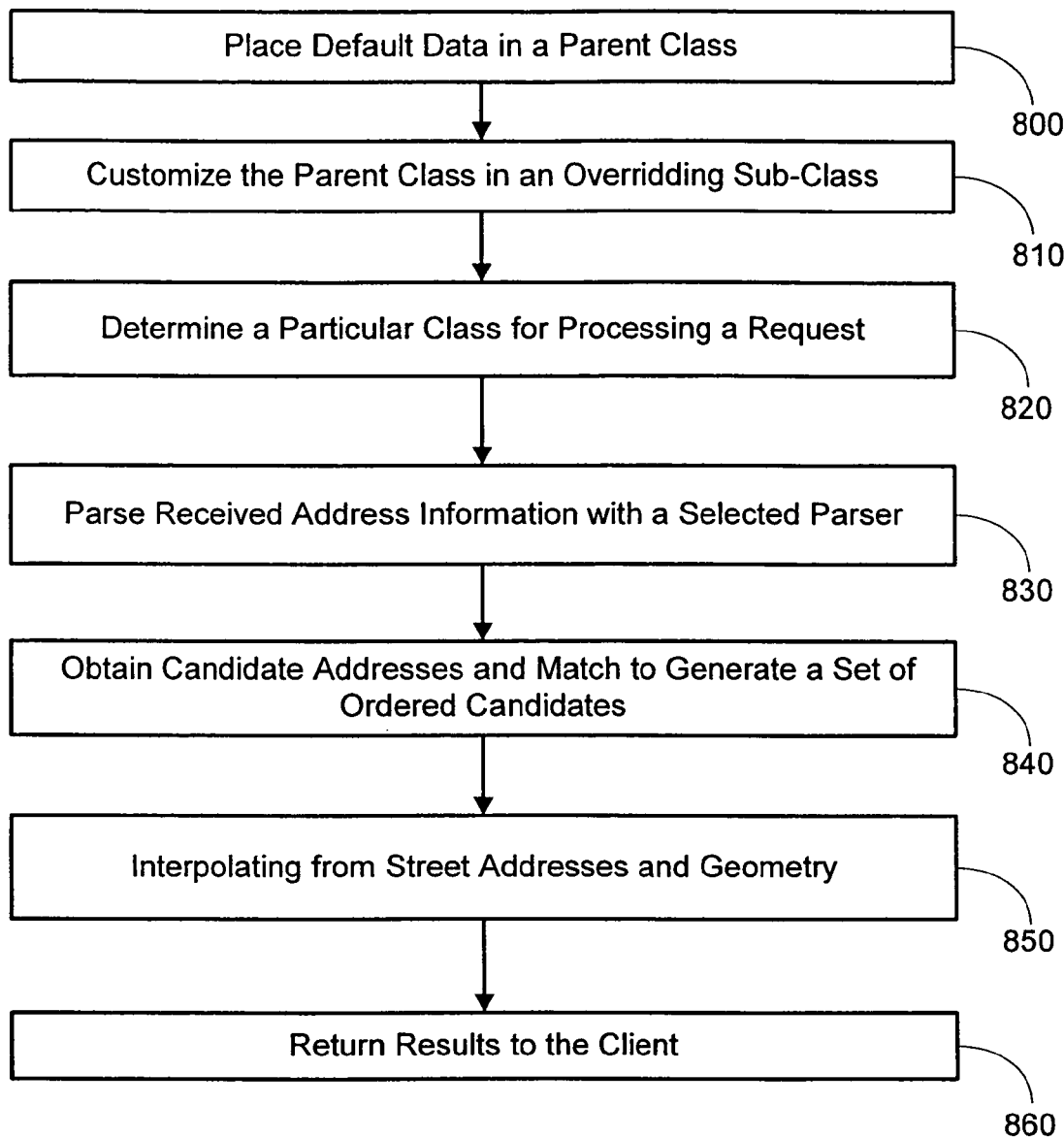
FIG. 8 illustrates exemplary steps for processing a geocoding request seeking spatial information.

FIG. 8 illustrates exemplary steps in a method for providing geographical or spatial information, such as geocodes, to users employing diverse formats. The method allows extensible design by placing, during step 800, default data and methods in a parent class and then, during step 810, customizing the parent class in a sub-class. Thus, if the data is accessed directly through the sub-class then the customized data is obtained from fields customized by the sub-class while the default data remains available, if required, in the parent class. During step 820, a determination is made to use a particular class for processing a request, for instance, by considering a country code designation. Accordingly, the address information in a request is parsed by a selected parser to generate a parsed object during step 830. Next, during step 840, candidate addresses are obtained and matched to generate a set of ordered matches corresponding to the parsed object for responding to the user request. During step 850, a geocode for a candidate address may be generated by interpolating using the street geometry and address ranges. This is particularly useful for generating maps, streets and the like corresponding to a location of interest. Finally, the result is communicated to the client, preferably in an XML encoded message. Alternatively, any other machine readable encoding may be used.

Figure 9:
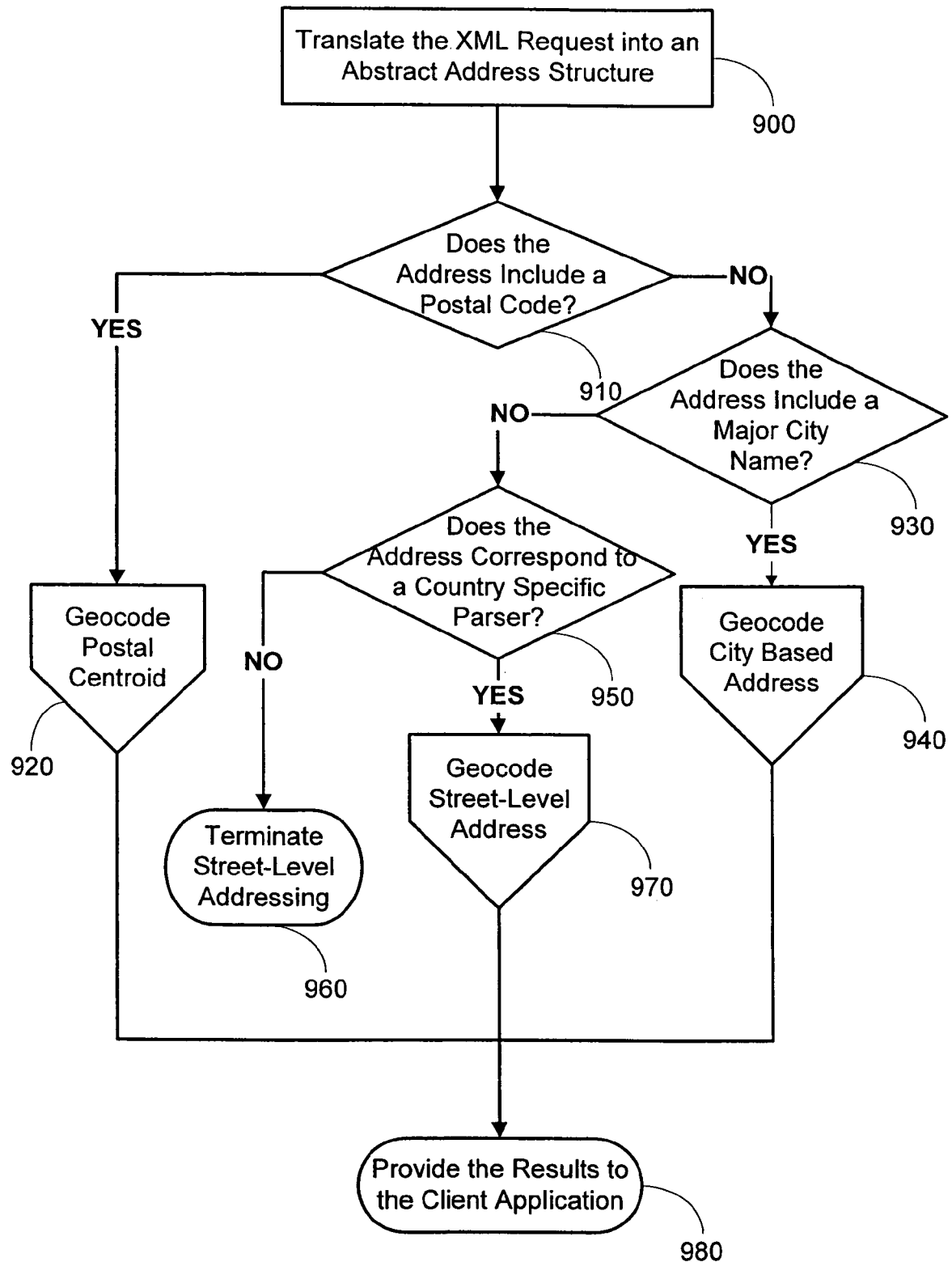
FIG. 9 illustrates alternative exemplary steps for processing a geocoding request.

FIG. 9 further illustrates an alternative to FIG. 3 as exemplary processing of an XML encoded request received at a geocoding server. As a preliminary matter, it should be noted that such a request may optionally be transmitted as a Simple Object Access Protocol ("SOAP") request by transmitting a Hyper Text Transfer Protocol ("HTTP") compliant envelope containing the SOAP XML encoded request.

During step 900, the XML request is translated into an abstract address structure based on the country and request type and control flows to step 910. During step 910, if a postal code is detected in the address, then control flows to step 920 for postal-centroid geocoding. Otherwise, control passes from step 910 to step 930. During step 930, if a major city name is detected in the address then control flows to step 940 for geocoding city based addresses. On the other hand, if during step 930 a major city name is not detected, then control flows to step 950. During step 950, a determination is made if the address corresponds to a country-specific parser. In response to a failure to detect a suitable country specific parser, the procedure terminates during step 960. Otherwise, street-level geocoding is performed during step 970. The geocoding result is provided to the client application during step 980, preferably after encoding them in XML as well. In this preferred embodiment described in FIG. 9, geocoding is enabled in the alternative at the postal code, city or street-level. In other embodiments, the order of the steps may be modified or concurrent processing allowed to enable use of one or more of postal-code, city name, and street level geocoding.

It will be appreciated that the various features described herein may be used singly or in any combination thereof. Thus, the present invention is not limited to only the embodiments specifically described herein. While the foregoing description and drawings represent an embodiment of the present invention, it will be understood that various additions, modifications, and substitutions may be made therein without departing from the spirit and scope of the present invention as defined in the accompanying claims. In particular, it will be clear to those skilled in the art that the present invention may be embodied in other specific forms, structures, and arrangements, and with other elements, and components, without departing from the spirit or essential characteristics thereof. One skilled in the art will appreciate that the invention may be used with many modifications of structure, arrangement and components and otherwise, used in the practice of the invention, which are particularly adapted to specific environments and operative requirements without departing from the principles of the present invention. The presently disclosed embodiment is therefore to be considered in all respects as illustrative and not restrictive, the scope of the invention being indicated by the appended claims, and not limited to the foregoing description.

APPENDIX A

Described below are some example DTDs in an non-exhaustive illustrative list:

```
<!ELEMENT RequestEnvelope (USA_GeocodeRequest |
RouteRequest | MapImageRequest | MapVectorRequest)>;
    <!ELEMENT ResponseEnvelope (USA_GeocodeResponse |
RouteResponse | USA_GeocodeFaultResponse | RouteFaultResponse |
MapImageFaultResponse)>;
    <!ELEMENT USA_GeocodeRequest ((UnparsedAddress |
USA_ParsedAddress), USA_GeocodeConstraints?,
USA_ResponseConstraints?)>;
    <!ELEMENT USA_ParsedAddress (USA_StreetAddressData,
USA_AddressGeographyData)>;
        <!ATTLIST USA_ParsedAddress Type (raw | normalized) "raw">;
    <!ELEMENT USA_StreetAddressData (AddressNumber?,
PreDirectional?, PostDirectional?, StreetBase?, PreThoroughfareType?,
PostThoroughfareType?, UnitType?, UnitValue?, Firm?,
Customer?, Office?)>;
    <!ELEMENT AddressNumber (#PCDATA)>;
    <!ELEMENT PreDirectional (#PCDATA)>;
    <!ELEMENT PostDirectional (#PCDATA)>;
    <!ELEMENT StreetBase (#PCDATA)>;
    <!ELEMENT PreThoroughfareType (#PCDATA)>;
    <!ELEMENT PostThoroughfareType (#PCDATA)>;
    <!ELEMENT UnitType (#PCDATA)>;
    <!ELEMENT UnitValue (#PCDATA)>;
    <!ELEMENT Firm (#PCDATA)>;
    <!ELEMENT Customer (#PCDATA)>;
    <!ELEMENT Office (#PCDATA)>;
    <!ELEMENT USA_AddressGeographyData (City?, Urbanization?,
County?, State?, ZipCode?, Plus4?)>;
    <!ELEMENT City (#PCDATA)>;
    <!ELEMENT Urbanization (#PCDATA)>;
    <!ELEMENT County (#PCDATA)>;
    <!ELEMENT State (#PCDATA)>;
    <!ELEMENT ZipCode (#PCDATA)>;
    <!ELEMENT Plus4 (#PCDATA)>;
```

Listed next are several XML elements for communicating constraints, typically as part of a request, but also possibly as part of a response to a request:

```
<!ELEMENT USA_GeocodeConstraints (AddressConstraints |
ZipConstraints | GeographicAreaConstraints |PointOfInterestConstraints |
CASSConstraints)?>;
    <!ELEMENT AddressConstraints (AddressCloseMatchConstraints?,
SearchRadiusExtension?,DistanceFromCorner?, DistanceFromStreet?)>;
    <!ELEMENT AddressCloseMatchConstraints
((MustMatchHouseNumber, MustMatchStreet, MustMatchZipCode,
MustMatchCity) | (MustMatchInput))?>;
    <!ELEMENT MustMatchHouseNumber (#PCDATA)>;
    <!ELEMENT MustMatchStreet (#PCDATA)>;
    <!ELEMENT MustMatchZipCode (#PCDATA)>;
    <!ELEMENT MustMatchCity (#PCDATA)>;
    <!ELEMENT MustMatchInput (#PCDATA)>;
    <!ELEMENT SearchRadiusExtension (LinearUnit, Distance)>;
    <!ATTLIST SearchRadiusExtension LimitSearch (true | false)
#REQUIRED>;
    <!ELEMENT Distance (#PCDATA)>;
    <!ELEMENT DistanceFromCorner (LinearUnit, Distance)>;
    <!ELEMENT DistanceFromStreet (LinearUnit, Distance)>;
    <!ELEMENT ZipConstraints EMPTY>;
        <!ATTLIST ZipConstraints Match (zip | zipplus2 | zipplus4 | input)
#IMPLIED>;
    <!ELEMENT
GeographicAreaConstraints(GeographicAreaCloseMatchConstraints)?>;
    <!ELEMENT
```

```
GeographicAreaCloseMatchConstraints((MustMatchUrbanization,
   MustMatchCity, MustMatchCounty, MustMatchState) |
   (MustMatchInput))?>;
     <!ELEMENT MustMatchUrbanization (#PCDATA)>;
     <!ELEMENT MustMatchCounty (#PCDATA)>;
     <!ELEMENT MustMatchState (#PCDATA)>;
     <!ELEMENT PointOfInterestConstraints EMPTY>; and
     <!ELEMENT CASSConstraints EMPTY> (if present use predefined
USPS Coding Accuracy Support System rules).
```

In the case of Geocode response constraints as usual all unspecified values assume the server default settings. Some additional XML elements' descriptions are:

```
<!ELEMENT USA_ResponseConstraints (MaxCandidates?,
CoordinateReferenceSystem?, SuccessResponse?, FaultResponse?)>;
    <!ELEMENT MaxCandidates (#PCDATA)>;
    <!ELEMENT SuccessResponse EMPTY>;
       <!ATTLIST SuccessResponse ReturnCloseMatchesOnly (true | false)
"true">;
       <!ATTLIST SuccessResponse IncludeRequest (true | false) "false">;
       <!ATTLIST SuccessResponse IncludeParsedAddress (true | false)
"false">;
       <!ATTLIST SuccessResponse IncludeActualConstraints (true | false)
"false">;
    <!ELEMENT FaultResponse EMPTY>;
       <!ATTLIST FaultResponse IncludeRequest (true | false) "false">;
       <!ATTLIST FaultResponse IncludeParsedAddress (true | false)
"false">; and
       <!ATTLIST FaultResponse IncludeActualConstraints (true | false)
"false">.
```

Notably, response to a successful geocode request includes a response without any candidates since a correctly formed request that generates no candidates is not considered a fault.

```
<!ELEMENT USA_GeocodeResponse (GeocodeSummary,
USA_GeocodeLocationList, USA_GeocodeRequest?,
USA_ParsedAddress?, USA_GeocodeConstraints?)>;
    <!ATTLIST USA_GeocodeResponse
RequestConstraintsOverridden (true | false) "false">;
    <!ELEMENT USA_GeocodeLocationList
((CoordinateReferenceSystem, USA_GeocodeLocation*))>
<!-- list order: best to worst -->;
    <!ELEMENT USA_GeocodeLocation (USA_ParsedAddress, coord) >;
       <!ATTLIST USA_GeocodeLocation CloseMatch (true | false)
#REQUIRED>; and
       <!ATTLIST USA_GeocodeLocation ActualConstraintsExceeded
(true | false) "false">.
```

Response to a geocode request containing a fault is handled differently. In this context a fault means that there was a condition that prevented the geocode engine from running. Some fault messages are:

```
<!ELEMENT USA_GeocodeFaultResponse (FaultMessage,
FaultCode?, USA_GeocodeRequest?)>;
    <!ELEMENT FaultMessage (#PCDATA)>; and
    <!ELEMENT FaultCode (#PCDATA)>.
```

We claim:

1. A computer geocoding engine for providing geocodes in response to receiving address information from a remote user, the geocoding engine comprising:

a processor configured with computer readable instructions, said processor further comprising, a module for detecting a country code designation in a request to provide a geocode a module for invoking a parser corresponding to the country code from the received request to provide a parsed input address;

a module for detecting a postal-code corresponding to the country code in the received request;

a module for detecting a world city name in the received request;

a module for obtaining a candidate list corresponding to at least one member of a set consisting of the postal-code, the parsed input address, and the world city name;

a module for invoking a matcher module for evaluating the candidate list by matching it to the input address;

a module for invoking an interpolator corresponding to the country code for generating a geocode corresponding to a selected candidate; and a module for generating a set of ordered matches corresponding to the parsed input address for responding to the request.

2. A computer-implemented method stored on a computer which allows a computer to execute a method for providing geographical information to a plurality of users, the plurality of users employing a plurality of formats of address inputs, the computer-implemented method comprising steps of: encoding geographical data to generate default data in a parent class; overriding at least a portion of the default data via a sub-class so that access via the sub-class accesses customized data rather than the overridden; determining, in response to a user request specifying a country code, the sub-class for processing geographical data corresponding to the country code; processing the user request via a sub-class implemented parser to generate a parsed object; and matching the parsed object to generate a set of ordered matches corresponding to the parsed object for responding to the user request.

3. The computer-implemented method of claim 1 further including the step of selecting a parser corresponding to the country code.

4. The computer-implemented method of claim 1 further including the step of interpolating between know geographical points to generate geographical data corresponding to a selected match from the set of ordered matches for responding to the user request.

5. The computer-implemented method of claim 1 further including the step of interpolating to determine a geocode of a desired type from the selected match form the set of ordered matches for responding to the user request.

* * * * *